United States Patent
Ota et al.

[11] Patent Number: 6,103,344
[45] Date of Patent: Aug. 15, 2000

[54] HEAT-FUSED UNITARY FERRULE AND METHOD FOR PRODUCING THE SAME

[75] Inventors: Takashi Ota, Kasugai; Masashi Fukuyama, Komaki; Hitoshi Hasegawa, Kounan; Kazutoshi Tohyama, Nakatsugawa, all of Japan

[73] Assignees: NGK Insulators, Ltd; NGK Optoceramics Co., Ltd, both of Japan

[21] Appl. No.: 09/004,567

[22] Filed: Jan. 8, 1998

[30] Foreign Application Priority Data

Jan. 9, 1997 [JP] Japan ..................... 9-002072

[51] Int. Cl.[7] ............... B32B 3/00; G02B 6/38; G02B 37/15
[52] U.S. Cl. ............ 428/172; 428/167; 385/65; 385/83; 385/85; 385/89; 385/92; 65/41; 65/406
[58] Field of Search .............. 428/34, 167, 172, 428/192, 212; 156/109, 89, 11, 304.6; 385/65, 83, 85, 89, 92; 65/36, 41, 406

[56] References Cited

U.S. PATENT DOCUMENTS

| | | | |
|---|---|---|---|
| 2,297,337 | 9/1942 | Wiley | 428/34 |
| 2,398,371 | 4/1946 | Gerspacher | 428/34 |
| 4,683,154 | 7/1987 | Benson et al. | 428/34 |
| 4,941,302 | 7/1990 | Barry | 428/34 |
| 5,249,246 | 9/1993 | Szanto | 385/96 |
| 5,907,651 | 5/1999 | Bunin et al. | 385/80 |

*Primary Examiner*—Donald Loney
*Attorney, Agent, or Firm*—Wall Marjama Bilinski & Burr

[57] ABSTRACT

A heat-fused unitary ferrule includes a first glass substrate and a second glass substrate. The first glass substrate and the second glass substrate are unitarily joined by heat-fusion. A method for producing a heat-fused unitary ferrule includes the steps of: bringing a surface to be heat-fused of the first glass substrate having a groove for fixing an optical fiber into contact with a surface to be heat-fused of the second glass substrate; and subjecting the first and second glass substrates to heat-fusion at a temperature ranging from $(Tg1-100)°$ C. to $(Tg2+150)°$ C. ($Tg1$ denotes the higher glass transition temperature, and $Tg2$ denotes the lower glass transition temperature of the first and second glass substrates).

20 Claims, 6 Drawing Sheets

HEAT-FUSED PORTION

HEAT-FUSED UNITARY FERRULE AND METHOD FOR PRODUCING THE SAME

BACKGROUND OF THE INVENTION AND RELATED ART STATEMENT

The present invention relates to a heat-fused unitary ferrule and a method for producing it.

There are two kinds of parts for arraying fibers. One is a fiber array for connecting a fiber with another optical part, and the other is a MT connector for connecting a fiber with another fiber.

As a material for a fiber array, glass or silicon is generally used because most optical parts, such as a wave guide, to be connected to the fiber array have low heat expansion rate. Recently, development of a low-cost glass material having high quality has been proceeding, and glass is most popular as a material for a fiber array at present.

In a fiber array having a conventional V groove, a fiber was positioned on a V groove, the V groove and fiber were put between substrates for fixing the fiber, and the fiber was fixed using an adhesive or the like.

However, a fiber array using an adhesive sometimes had exfoliation on the joined surface because of changes in environmental conditions such as humidity and heat.

Moreover, a highly purified filler is added thereto for the purpose of lowering a hardening shrinkage rate so as to decrease deterioration by hardening shrinkage of the adhesive, and a silane coupling agent is added thereto for the purpose of improving adhesive strength. Thus, the adhesive used for fixing the fiber is so special that it is very expensive.

Furthermore, assembly of a conventional fiber array requires simultaneous performance of pressing a fiber down to a groove for fixing the fiber and pressing the second glass substrate down to the first glass substrate. The assembly was so complex that it required jigs, tools and skilled workers.

On the other hand, MT connector is low-priced and has high dimensional preciseness because it is generally made of plastic. Therefore, a large quantity of MT connectors are used as connectors for connecting a fiber to a fiber. However, it cannot be suitably used for connecting a fiber with an optical element such as a fiber array because of a high coefficient of thermal expansion.

Since a plastic connector does not transmit ultraviolet radiation, a heat-hardening type resin is used for fixing a fiber. Therefore, its productivity is poor. Particularly, there is a problem of long hardening time when connecting fibers at a work site.

The present invention solves these conventional problems and aims to provide a heat-fused unitary ferrule having high bonding strength, high water resistance high productivity, and a low price, and a method for producing it.

SUMMARY OF THE INVENTION

According to the present invention, there is provided a heat-fused unitary ferrule comprising:

a first glass substrate; and a second glass substrate;

the first glass substrate and the second glass substrate being unitarily joined by heat-fusion.

The first glass substrate preferably has at least one groove for fixing an optical fiber. Preferably, the first glass substrate further has a groove for fixing a guide formed on each of both sides of the groove for fixing an optical fiber, and the second glass substrate has a groove for fixing a guide.

Incidentally, each of the groove for fixing an optical fiber and the groove for fixing a guide has a cross-sectional shape of V or U, or a tapered shape.

The first glass substrate and the second glass substrate may be made of the same material. Alternatively, a material for the first glass substrate may be different from a material for the second glass substrate, and in such a case, a glass transition temperature of the second glass substrate is preferably lower than that of the first glass substrate.

Preferably, an area of heat-fusion between the first glass substrate and the second glass substrate is 0.01 mm$^2$ or more.

According to the present invention, there is further provided a method for producing a heat-fused unitary ferrule, comprising the steps of:

bringing a surface to be heat-fused of the first glass substrate having a groove for fixing an optical fiber into contact with a surface to be heat-fused of the second glass substrate; and subjecting the first and second glass substrates to heat-fusion at a temperature ranging from (Tg1−100)° C. to (Tg2+150)° C. (Tg1 denotes the higher glass transition temperature, and Tg2 denotes the lower glass transition temperature of the first and second glass substrates.)

Incidentally, the groove for fixing an optical fiber preferably has a cross-sectional shape of V or U, or a tapered shape.

A heat-fused surface of each of the first and second glass substrates preferably has a maximum surface roughness (Rmax) of 0.5 µm or less.

DETAILED DESCRIPTION OF THE PREFERRED EMBODIMENT

The present invention is hereinbelow described in detail on the basis of drawings.

Figure 1:
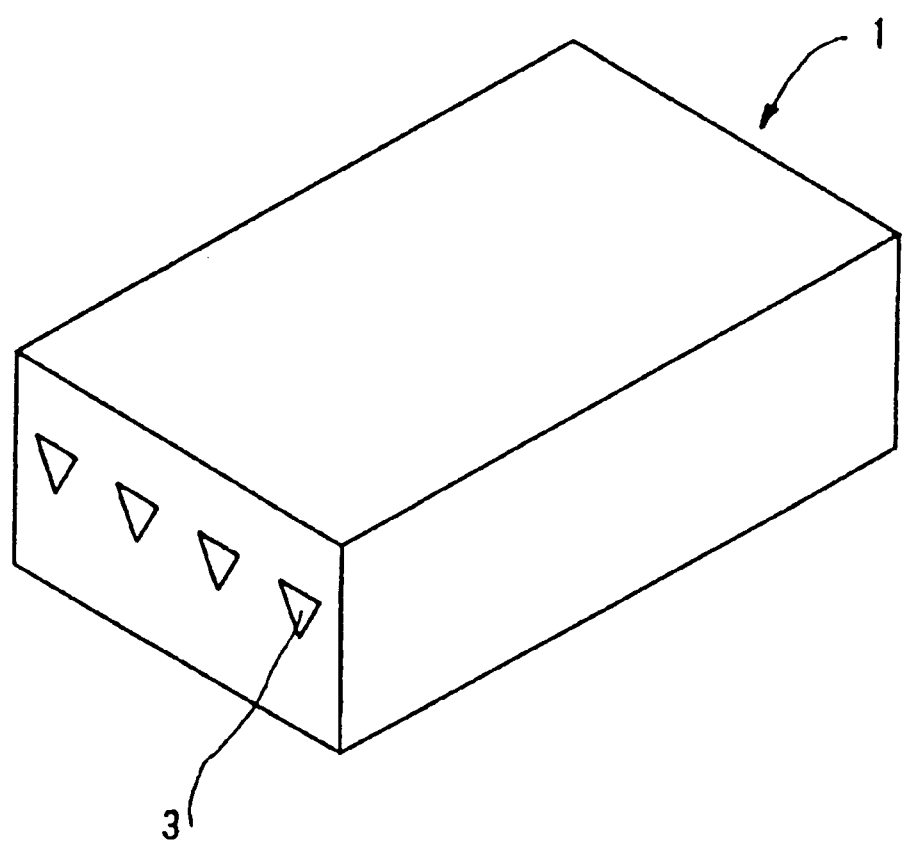
FIG. 1 is a schematic perspective view showing an embodiment of a heat-fused unitary ferrule of the present invention.

FIG. 1 is a perspective view of a heat-fused unitary ferrule showing an embodiment of the present invention.

Figure 2:
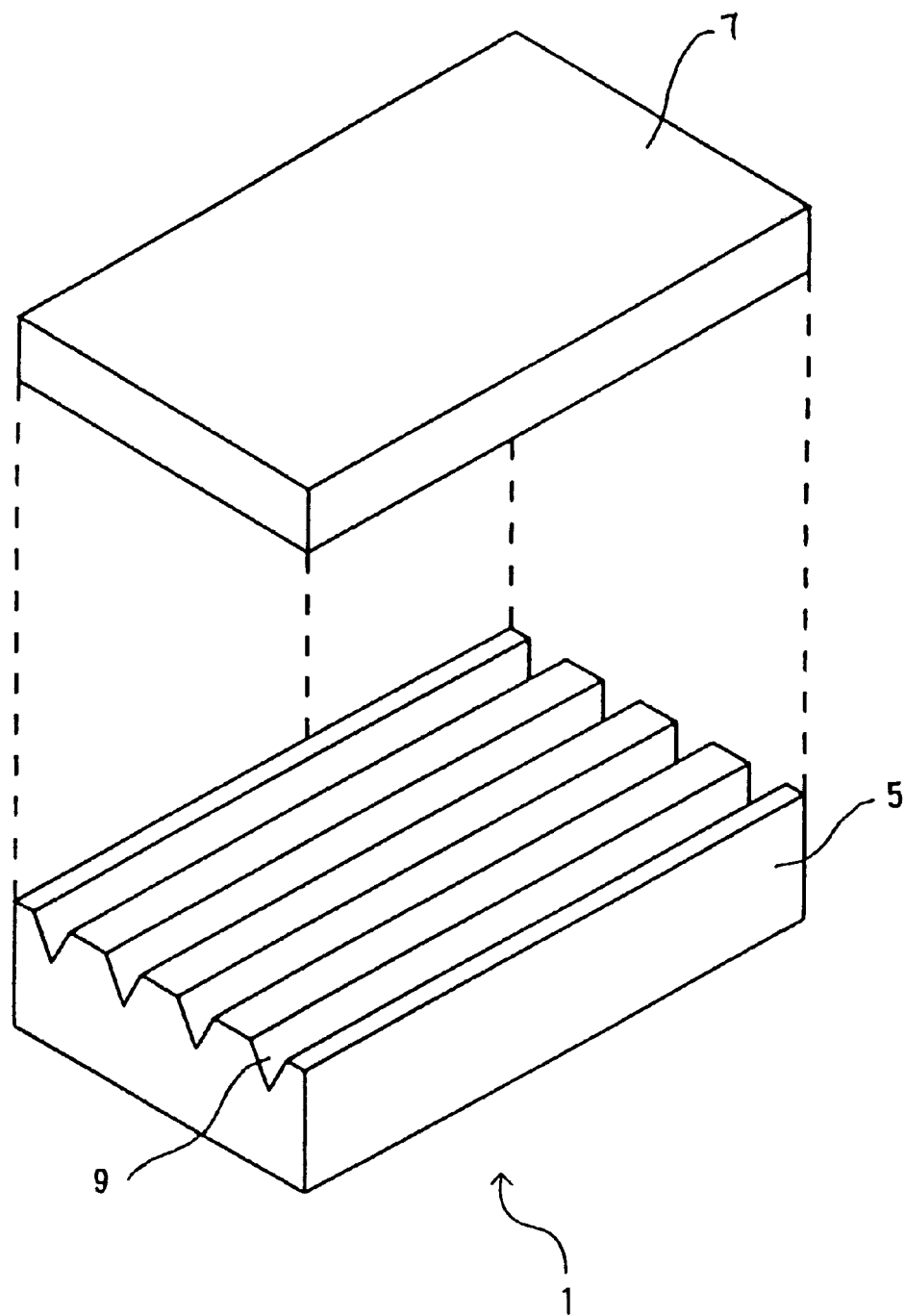
FIG. 2 is a perspective view showing a disintegrated heat-fused unitary ferrule of the FIG. 1 before heat-fusion.
Figure 3:
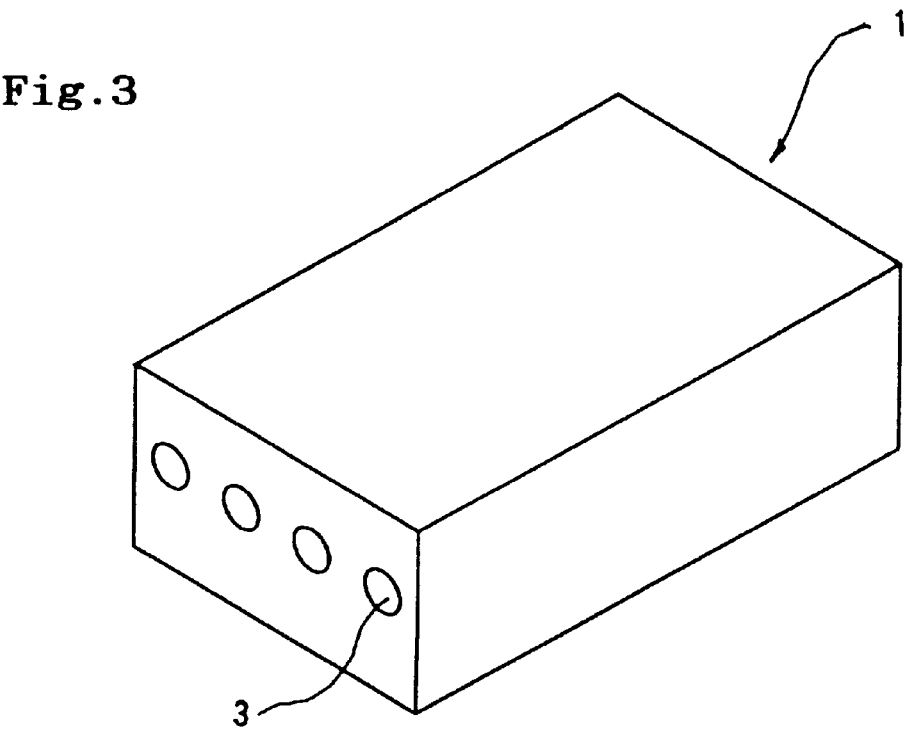
FIG. 3 is a schematic perspective view showing another embodiment of a heat-fused unitary ferrule of the present invention.
Figure 4:
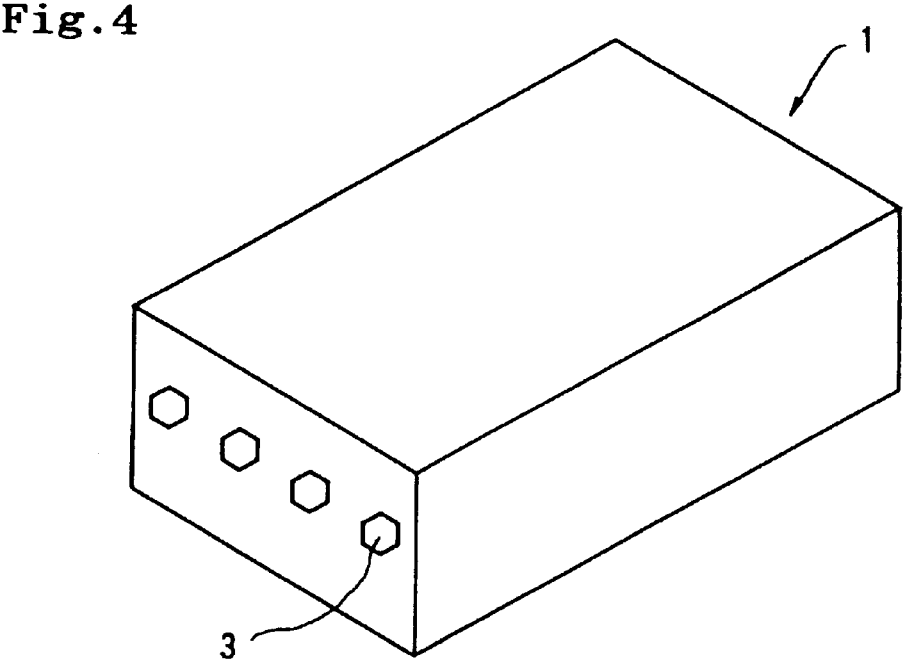
FIG. 4 is a schematic perspective view showing still another embodiment of a heat-fused unitary ferrule of the present invention.

FIG. 2 is a perspective view showing a decomposed heat-fused unitary ferrule of the FIG. 1 before heat-fusion.

In a heat-fused unitary ferrule 1 shown in FIGS. 1 and 2, a surface to be heat-fused of the first glass layer 5 having a plurality of grooves (V grooves) 9 for fixing optical fibers is brought into contact with a surface to be heat-fused of the second glass layer 7, and they are heat-fused to unify the first glass substrate 5 and the second glass substrate 7. The heat-fused unitary ferrule 1 can be suitably used as, for example, a fiber array.

Figure 8:
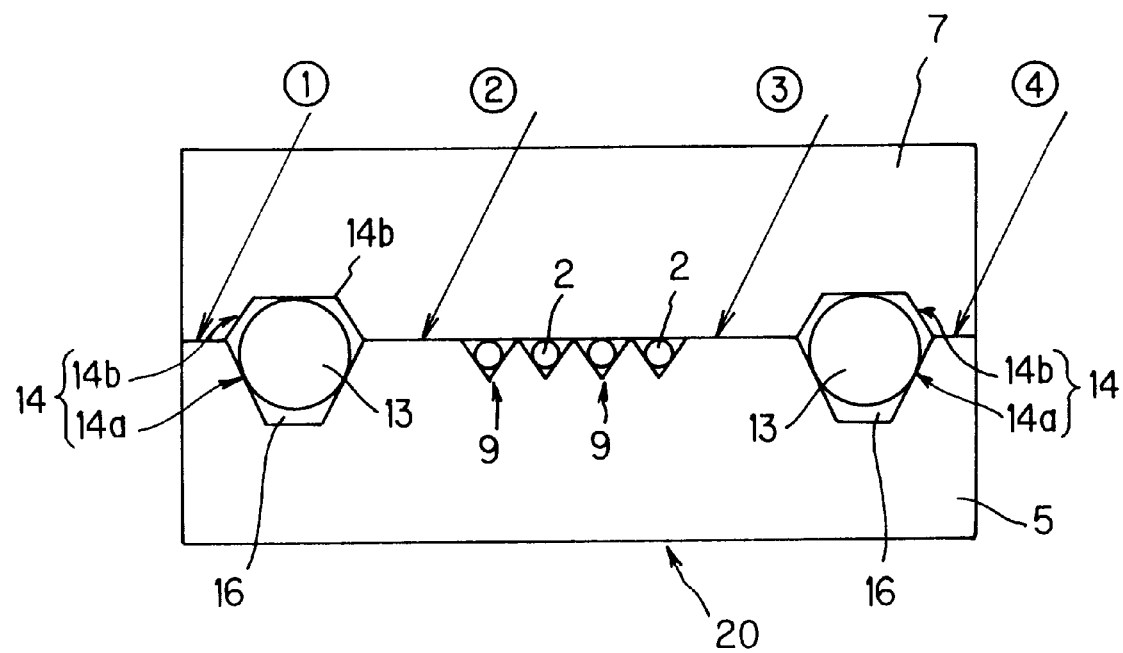
FIG. 8 is a schematic sectional view showing yet another embodiment of a heat-fused unitary ferrule of the present invention.

In a heat-fused unitary ferrule 20 shown in FIG. 8, a surface to be heat-fused of the first glass substrate 5 having a plurality of grooves (V grooves) 9 for fixing optical fibers and grooves (tapered grooves) 14a for fixing guides on both sides of the grooves 9 is brought into contact with a surface to be heat-fused of the second glass substrate 7 having grooves 14b for fixing guides. They are heat-fused to unify the first glass substrate 5 and the second glass substrate 7. The heat-fused unitary ferrule 20 shown in FIG. 8 can be suitably used as, for example, a MT connector.

In this case, a glass transition temperature of the second glass substrate 7 is preferably lower than that of the first glass substrate 5. This is because heat-fusion can be easily performed at a low temperature when a glass transition temperature of the second glass substrate 7 is lower than that of the first glass substrate 5.

For example, there are used a material having a glass transition temperature of 560° C. as the first glass substrate 5 and a material having a glass transition temperature of 520° C. as the second glass substrate 7. When these glass substrates 5, 7 are heat-fused at 540° C., the first glass substrate 5 is hardly heat-fused, and second glass substrate 7 is easily heat-fused because the temperature is lower than the glass transition temperature of the first glass substrate 5 and higher than the glass substrate temperature of the second glass substrate 7. As a result, an excellent fusion becomes possible. Further, heat deformation of the first glass substrate 5 can be controlled because the temperature is lower than a glass transition temperature of the first glass substrate 5, thereby maintaining the precise shape of the groove 9 for fixing an optical fiber formed in the first glass substrate 5.

Grooves 9 for fixing optical fibers and grooves 14 for fixing guides are V grooves and tapered grooves, respectively, in Examples in FIGS. 1, 2, and 8. However, the shapes are not limited to such shapes and may be selected from V, U, and tapered shapes.

The grooves 9 for fixing optical fibers and grooves 14 for fixing guides may be formed on either of or both the first glass substrate 5 and the second glass substrate 7.

Incidentally, for a groove 14 for fixing a guide, grooves 14a and 14b for fixing a guide are preferably formed on both the first glass substrate 5 and the second glass substrate 7 to firmly fix a guide as shown in FIG. 8.

When these parts are combined with each other, desired sectional shapes such as triangle, circle, and hexagon of a throughhole 3 for inserting a fiber (see FIGS. 1–4) and an opening 16 for inserting a guide (see FIG. 8) can be formed, thereby improving wide usage.

Diameters of maximum inscribed circles in the opening 3 for inserting a fiber and the opening 16 for inserting a guide are preferably about 1 $\mu$m larger than diameters of a fiber 2 and a guide 13.

Figure 5:
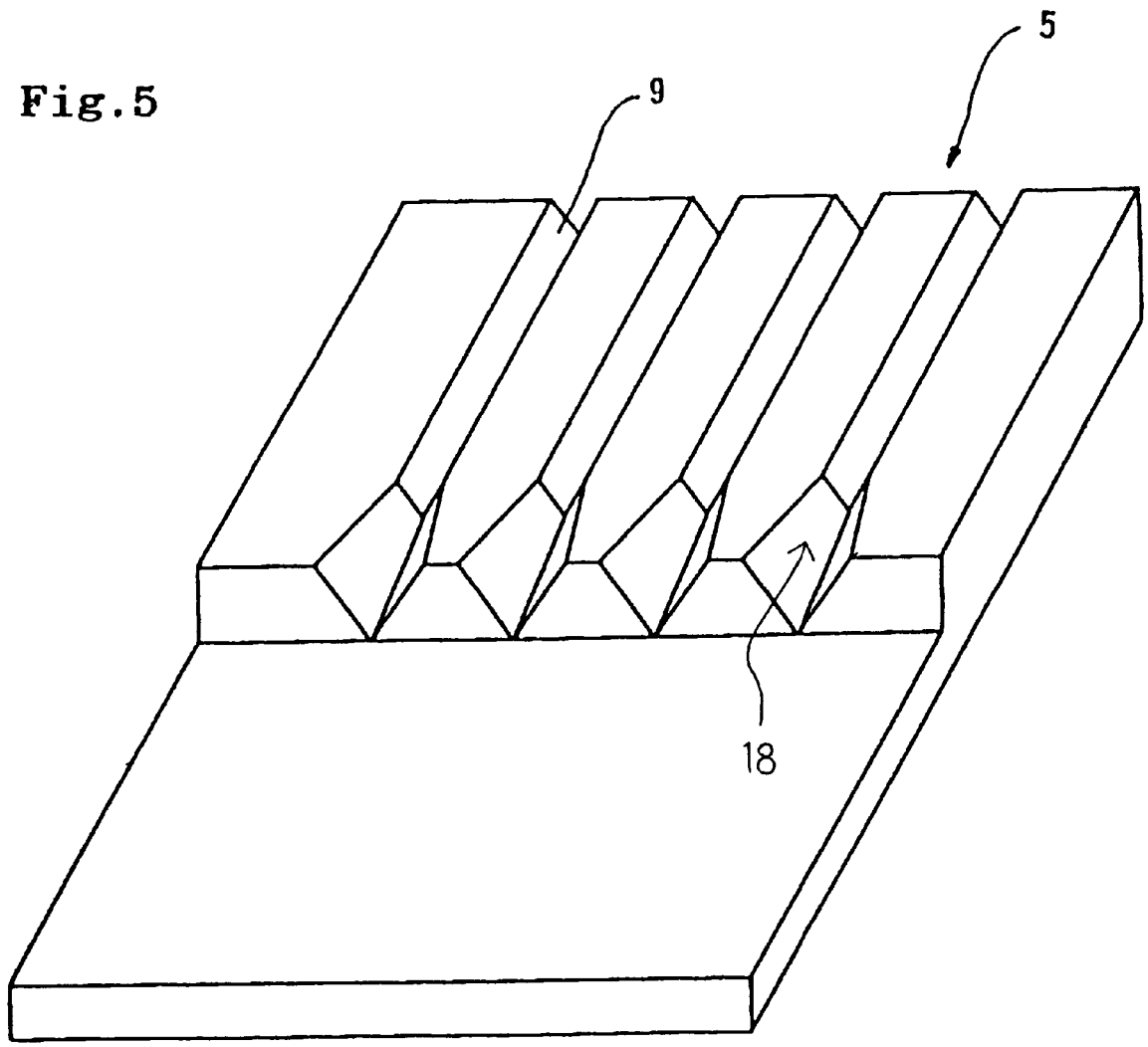
FIG. 5 is a schematic perspective view showing an example of a shape of a throughhole for inserting a fiber therein of a heat-fused unitary ferrule of the present invention.

As shown in FIG. 5, it is preferable that an opening of the throughhole 3 for inserting a fiber is enlarged and that a tapered portion 18 is formed because a fiber can be inserted more easily.

In a heat-fused unitary ferrule of the present invention, a length of the first glass substrate 5 and that of the second glass substrate are preferably different. It is particularly preferable that a length in the direction along grooves of the second glass substrate 7 is shorter than that of the first glass substrate 5.

The first glass substrate 5 and the second glass substrate 7 can be heat-fused only in a region where a covered optical fiber is fixed. Therefore, a strict dimensional control is not required in comparison with the case in which the second glass substrate 7 is fused. This improves workability.

Figure 6:
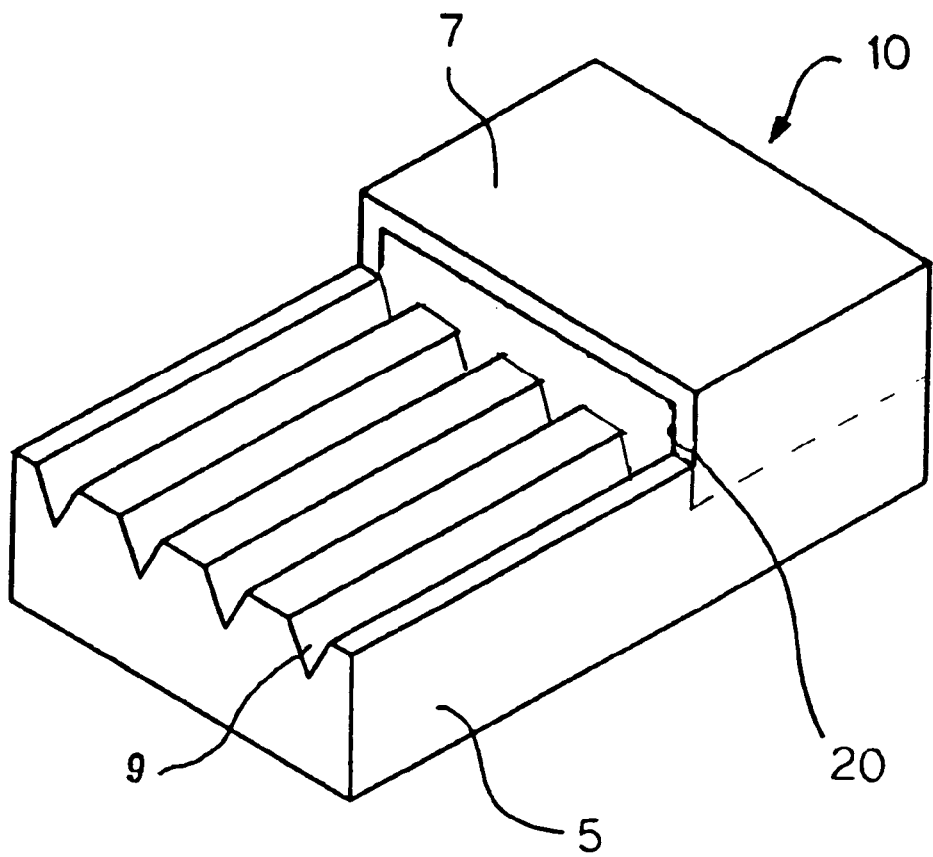
FIG. 6 is a schematic perspective view showing yet another embodiment of a heat-fused unitary ferrule of the present invention.

FIG. 6 shows an embodiment of a heat-fused unitary ferrule in which only a portion where a covered optical fiber is disposed is connected by heat-fusion.

In this ferrule 10, only a covered optical fiber storage portion 20 is formed by heat-fusion. The covered optical fiber storage portion 20 aims to store a covered optical fiber, and precision is not required in comparison with a V groove 9 storing an optical fiber without a cover. Therefore, it does not require processing for controlling a maximum surface roughness to be 0.5 $\mu$m or less.

In the case of this ferrule, a covered optical fiber storage portion 20 is not deteriorated by stress due to a bending peculiarity of a covered optical fiber, or the like, and reliability of at least a covered optical fiber storage portion 20 can be secured.

Then, a method for producing a heat-fused unitary ferrule of the present invention is hereinbelow described with reference to FIGS. 1 and 2.

The upper substrate 7, which is the second glass substrate, is positioned so as to be in contact with the substrate 5 having V grooves, which is the first glass substrate. Then, a load of a predetermined value or more is applied to contact surfaces of the substrates 5 and 7. In this state, the substrates 5 and 7 are heated for a predetermined length of time at a temperature ranging from $(Tg1-100)°$ C. to $(Tg2+150)°$ C. ($Tg1$ denotes the higher glass transition temperature, and $Tg2$ denotes the lower glass transition temperature) so as to activate surfaces of the substrate 5 having V grooves and the upper substrate 7. Activation energy connects the surfaces with each other, and the substrate 5 having V grooves and the upper substrate 7 are unified to form a ferrule 1.

Generally, a glass transition temperature of the first glass substrate (substrate having V grooves) 5 is $Tg1$ because it is higher, and a glass transition temperature of the second glass substrate (upper substrate) 7 is $Tg2$.

If the substrates are heated at a temperature higher than $(Tg2+150)°$ C., the grooves 9 for fixing optical fibers formed in the substrate 5 having V grooves are deformed, and throughholes having a predetermined shape cannot be obtained. If the substrates are heated at a temperature lower than $(Tg1-100)°$ C., activation does not start on the surfaces of the substrate 5 having V grooves and the substrates 7. Therefore, they cannot be heat-fused.

It is not necessary to further apply a load when the upper substrate 7 has a weight of a predetermined value or more.

A heating atmosphere upon heat-fusion of the substrate 5 having V grooves and the upper substrate 7 may be an oxidizing atmosphere or a reducing atmosphere. A length of heating time is suitably determined depending on a material of the substrates, a heat temperature, and a load.

When a single mode fiber is used for a heat-fused unitary ferrule (fiber array, MT connector) of the present invention, a disposition precision is desirably 1 $\mu$m or less. It is important to strictly control dimensional precision and deformation by heat-fusion of the groove for fixing the optical fiber before being heat-fused.

It is preferable to control a maximum surface roughness (Rmax) to be 0.5 μm or less of each of the surfaces to be heat-fused of the first glass substrate 5 and the second glass substrate 7, thereby reducing a deformed amount upon heat-fusion.

The deformed amount depends on a environmental temperature, a load, a time for connection, and a surface roughness of each of the first glass substrate and the second glass substrate.

Further, it is not necessary that all the portions to be connected of the first glass substrate 5 and the second glass substrate 7 are heat-fused. The heat-fused portion is preferably minimum as long as there is no problem in point of connection strength and water-resisting ability in view of maintaining dimensional precision of grooves 9 for fixing an optical fiber because dimensions can be easily controlled. That is, reliability can be ensured as long as a total area of the surfaces to be heat-fused of the first glass substrate 5 and the second glass substrate 7 is 0.01 mm$^2$ or more.

Figure 7:
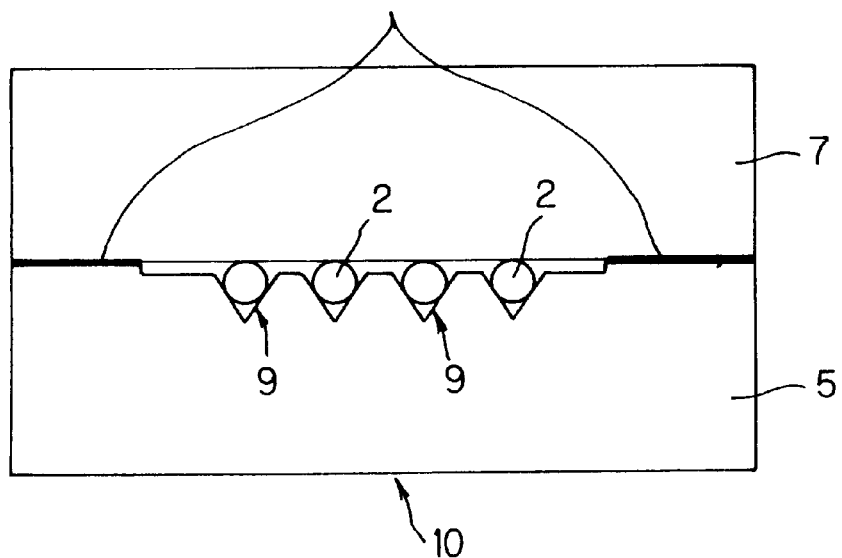
FIG. 7 is a schematic sectional view showing yet another embodiment of a heat-fused unitary ferrule of the present invention.

For example, in a heat-fused unitary ferrule 10 shown in FIG. 7, the first glass substrate 5 and the second glass substrate 7 were joined by heat-fusion lest the second glass substrate 7 should contact to the V grooves 9 for fixing optical fibers of the first glass substrate 5.

Thus, grooves 9 for fixing optical fibers is not heat-fused positively, only the plane portion is heat-fused. This reduces risk of destroying a shape of a groove 9 for fixing an optical fiber upon heat-fusion, and dimensional precision of V grooves 9 for fixing optical fibers can be maintained.

In the case of a heat-fused unitary ferrule 20 shown in FIG. 8, surfaces to be heat-fused may be all the surfaces ①–④. However, dimensional precision of grooves 9 for fixing optical fibers can be maintained by heat-fusion of only the surfaces ① and ④.

In this case, a total area of surfaces to be fused of the first glass substrate 5 and the second glass substrate 7 is preferably 0.1 mm$^2$ or more.

In the present invention, a combination of materials for the first glass substrate and the second glass substrate is not particularly limited. If a material for the first glass substrate is the same as a material for the second glass substrate, control of job requirements becomes easy because thermal properties are the same. Further, it is preferable that the same material is used for both the first glass substrate and the second glass substrate, because the substrates have the same coefficient of thermal expansion, and therefore, stress depending on a difference of thermal expansion is not generated when temperatures of the substrates becomes ordinary temperature after heat-fusion.

A heat-fused unitary ferrule of the present invention is described in more detail with reference to embodiments.
(Embodiment 1)

There were used the substrate 5 having V grooves, the substrate 5 having dimensions of 5 mm×5 mm×3 mm as the first glass substrate and the upper substrate 7 having dimensions of 5 mm×5 mm×1 mm as the second glass substrate 7. The substrate 5 had four V grooves 9. Surfaces to be heat-fused of the substrate 5 having V grooves and the upper substrate 7 had the maximum surface roughness (Rmax) of 0.5 μm.

The substrate 5 having V grooves and the upper substrate 7 are made of the same material, which has a transition temperature of 535° C. A reduced amount (amount of displacement) of the glass substrates 5 and 7 was previously measured under the conditions of a heat temperature of 675° C. and a load of only the upper substrate 7 itself. The amount of displacement was reflected to a design of dimensions for processing the V grooves 9. In this case, it is preferable to select conditions under which an amount of displacement is minimized in view of improvement of precision of the last diameter of a throughhole of a ferrule.

Since an amount of displacement was 5 μm in this embodiment, a width of the V grooves 9 before heat-fusion was set up to be (a fiber diameter+6)μm so as to obtain a clearance of 1 μm required upon insertion of an optical fiber.

As obvious from the above description, a ferrule of the present invention is unified by heat-fusion. Therefore, since improvements of bonding strength and water resistance are intended in comparison with a ferrule in which a conventional adhesive is used, reliability becomes very high.

Further, since a ferrule of the present invention does not need an adhesive for connecting one glass substrate, the cost can be reduced.

Furthermore, a ferrule of the present invention is made of glass, and an ultraviolet hardening-type resin can be used for fixing a fiber, thereby improving productivity.

Furthermore, a throughhole for inserting a fiber can be formed in a ferrule of the present invention. Therefore, the ferrule holds a fiber simultaneously with insertion of the fiber, thereby making application of an adhesive very easy.

Furthermore, since almost all kinds of glass materials can adapt to a ferrule of the present invention, there can be selected, for example, a glass material suitable for thermal expansion of a material in the periphery of the ferrule.

As described above, a ferrule of the present invention contributes to the development of the optical industry to a great extent.

What is claimed is:

1. An optical fiber connector for connecting at least one optical fiber to at least one optical component or another optical fiber, comprising:
   a first glass substrate having a first surface and at least one optical fiber-receiving groove formed in said first surface; and
   a second glass substrate having a first surface, a portion of which is unitarily joined to a portion of said first surface of said first glass substrate by heat-fusion;
   wherein a material for said first glass substrate is different from a material for said second glass substrate, and a glass transition temperature of said second glass substrate is lower than that of said first glass substrate.

2. An optical fiber connector according to claim 1, wherein said first glass substrate further comprises two guide-receiving grooves formed in said first surface thereof, and said at least one optical fiber-receiving groove is positioned between said guide-receiving grooves.

3. An optical fiber connector according to claim 2, wherein said second glass substrate comprises at least one guide-receiving groove formed in said first surface thereof.

4. An optical fiber connector according to claim 1, wherein said optical fiber-receiving groove has a cross-sectional shape selected from the group consisting of V, U, and tapered.

5. An optical fiber connector according to claim 2, wherein said guide-receiving groove has a cross-sectional shape selected from the group consisting of V, U, and tapered.

6. An optical fiber connector according to claim 1, wherein a length of said first glass substrate in a direction parallel to the longitudinal direction of said optical fiber-receiving groove is different from that of said second glass substrate.

7. An optical fiber connector according to claim 1, wherein a length of said first glass substrate in a direction parallel to the longitudinal direction of said optical fiber-receiving groove is longer than a length of said second glass substrate in said direction.

8. An optical fiber connector according to claim 1, wherein an area of heat-fusion between said first glass substrate and said second glass substrate is at least 0.01 mm².

9. A method for producing an optical fiber connector for connecting at least one optical fiber to at least one optical component or another optical fiber, comprising the steps of:

provinding a first glass substrate having a first surface and at least one optical fiber-receiving groove formed in said first surface;

providing a second glass substrate having a first surface;

bringing a portion of said first surface of said first glass substrate into contact with a portion of said first surface of said second glass substrate; and subjecting said first and second glass substrates to heat-fusion at a temperature ranging from $(Tg1-100)°$ C. to $(Tg2+150)°$ C., wherein Tg1 denotes the glass transition temperature of first glass substrate and Tg2 denotes the glass transition temperature of the second glass substrate, and Tg1 is higher than Tg2.

10. A method for producing an optical fiber connector according to claim 9, wherein the optical fiber-receiving groove has a cross-sectional shape selected from the group consisting of V, U, and tapered.

11. A method for producing an optical fiber connector according to claim 9, wherein a heat-fused surface of each of the first and second glass substrates has a maximum surface roughness (Rmax) of no more than 0.5 μm.

12. An optical fiber connector for connecting at least one optical fiber to at least one optical component or another optical fiber, comprising:

a first glass substrate having a first surface and at least one optical fiber-receiving groove formed in said first surface, said optical fiber-receiving groove having an outwardly tapered region proximate one end thereof for facilitating insertion of an optical fiber into said groove; and a second glass substrate having a first surface, a portion of which is unitarily joined to a portion of said first surface of said first glass substrate by heat-fusion.

13. An optical fiber connector according to claim 12, wherein said first glass substrate further comprises two guide-receiving grooves formed in said first surface thereof, and said at least one optical fiber-receiving groove is positioned between said guide-receiving grooves.

14. An optical fiber connector according to claim 13, wherein said second glass substrate comprises at least one guide-receiving groove formed in said first surface thereof.

15. An optical fiber connector according to claim 12, wherein said optical fiber-receiving groove has a cross-sectional shape selected from the group consisting of V, U, and tapered.

16. An optical fiber connector according to claim 13, wherein said guide-receiving groove has a cross-sectional shape selected from the group consisting of V, U, and tapered.

17. An optical fiber connector according to claim 12, wherein a length of said first glass substrate in a direction parallel to the longitudinal direction of said optical fiber-receiving groove is different from that of said second glass substrate.

18. An optical fiber connector according to claim 12, wherein a length of said first glass substrate in a direction parallel to the longitudinal direction of said optical fiber-receiving groove is longer than a length of said second glass substrate in said direction.

19. An optical fiber connector according to claim 12, wherein an area of heat-fusion between said first glass substrate and said second glass substrate is at least 0.01 mm².

20. An optical fiber connector according to claim 12, wherein a material for said first glass substrate is different from a material for said second glass substrate, and a glass transition temperature of said second glass substrate is lower than that of said first glass substrate.

* * * * *